United States Patent [19]

Medcraft

[11] 4,117,711

[45] Oct. 3, 1978

[54] COMBINATION CUTTING AND CRIMPING TOOL

[75] Inventor: Wayne R. Medcraft, Lakeville, Minn.

[73] Assignee: Belden Corporation, Geneva, Ill.

[21] Appl. No.: 842,627

[22] Filed: Oct. 17, 1977

[51] Int. Cl.² .................................... B21K 13/02
[52] U.S. Cl. ................................ 72/413; 72/477; 72/481; 29/560
[58] Field of Search ............... 72/413, 464, 477, 481; 83/580, 635; 29/560, 560.1; 30/226, 227

[56] References Cited

U.S. PATENT DOCUMENTS

| 311,648 | 2/1885 | Davin | 72/481 |
|---|---|---|---|
| 377,976 | 2/1888 | Babcock | 29/560.1 |
| 1,386,891 | 8/1921 | Mayer | 72/477 |
| 2,533,943 | 12/1950 | Klein | 72/481 |
| 3,066,717 | 12/1962 | Lynch, Jr. | 72/481 |
| 3,150,551 | 9/1964 | Spengler et al. | 83/580 |
| 3,246,396 | 4/1966 | Temple et al. | 83/580 |
| 3,316,744 | 5/1967 | Spangler | 72/477 |
| 3,342,076 | 9/1967 | Stone | 72/477 |
| 3,593,610 | 7/1971 | Valente | 83/580 |
| 3,919,877 | 11/1975 | Netta | 72/481 |

FOREIGN PATENT DOCUMENTS

2,454,436  5/1976  Fed. Rep. of Germany ............ 72/481

*Primary Examiner*—Lowell A. Larson
*Attorney, Agent, or Firm*—Fitch, Even, Tabin & Luedeka

[57] ABSTRACT

A combination cutting and crimping tool arrangement is disclosed having a housing defining an anvil underlying a vertically movable mandrel cooperative with the anvil to crimp a tubular connector body onto a cable disposed in supporting relation on the anvil, and wherein the housing has a vertical slot therethrough facilitating insertion of a cutting tool having a cutting edge operative to shear a cable when the cutting tool is impacted by the mandrel.

10 Claims, 5 Drawing Figures

U.S. Patent  Oct. 3, 1978  4,117,711
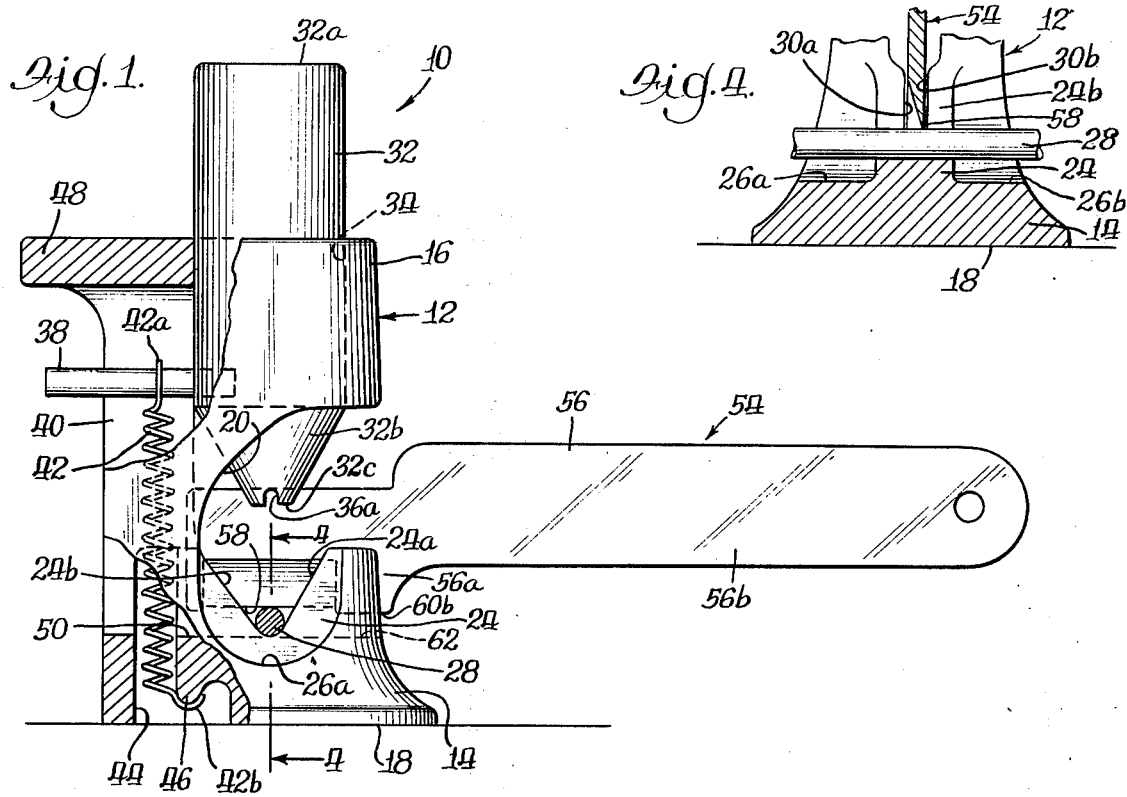
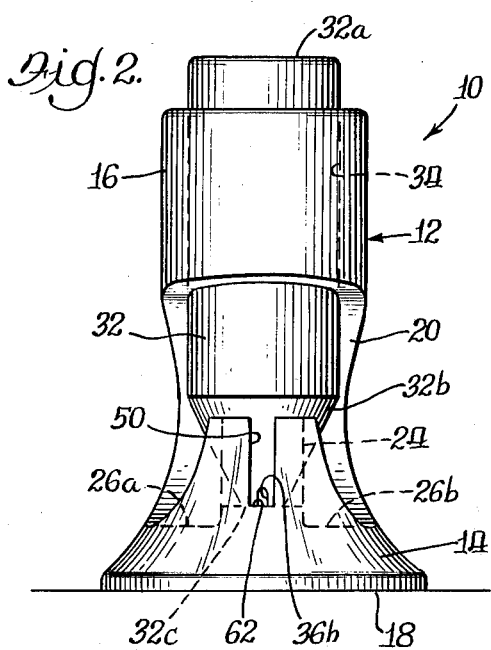
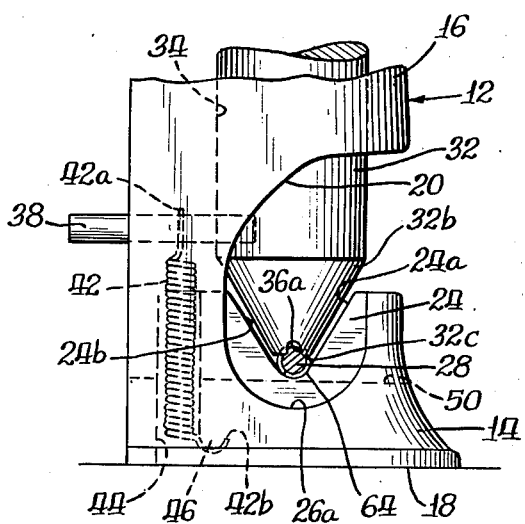
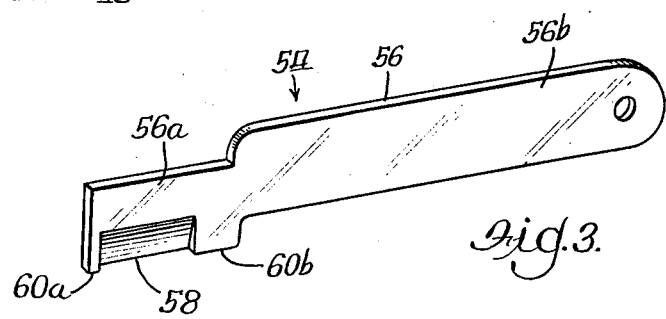

COMBINATION CUTTING AND CRIMPING TOOL

The present invention relates generally to tools for cutting cables and crimping connectors thereon, and more particularly to a novel combination cutting and crimping tool arrangement which facilitates both cutting a cable to form a square end thereon, and crimping a connector body onto the cable through the employment of the same tool combination.

It is frequently necessary in field installations employing metallic cables, either in structural guide wire type cables or in electrical conductors, to cut the wire at a predetermined position whereafter a connector or other terminal end is fixed to the cable end such as by crimping. With relatively small size cables, for example, up to ¼ or ⅜ inch diameter, cutting and crimping connectors onto the cable is a relatively simple operation and can be effected quite readily by hand tools. See for example, U.S. Pat. No. 2,583,625, dated Jan. 29, 1952, which discloses a plier type crimping tool for crimping electrical terminals or connectors onto relatively small gauge cable.

In cables of greater size, such as up to 1½" diameter cable, a substantially greater force must be employed to cut the cable than can normally be applied through a hand tool. In the case of larger size cables, devices have been developed which facilitate field usage and wherein a cutting blade or chisel type tool is adapted to be impacted such as by a hammer blow to shear the cable. See, for example, U.S. Pat. No. 2,201,142 dated May 21, 1940.

A substantial drawback in the use of cutting tools such as disclosed in the aforenoted U.S. Pat. No. 2,201,142 is that a separate and entirely different type tool must be carried by the operator and positioned to secure a connector or terminal onto the cut end of the cable for crimping the connector onto the cable. Attempts have been made to provide a single tool operable for both cutting a cable and thereafter crimping a connector or the like onto the cut end of the cable. See, for example, U.S. Pat. No. 3,333,607 dated Aug. 1, 1967. This patent discloses a cutting and crimping tool which is relatively complex in construction and therefore relatively expensive. Additionally, this cutting and crimping tool requires substantially long operating handles thereby making the device somewhat awkward to handle and manipulate and also requiring substantial storage space, in addition to its inconvenience for carrying on one's person to a remote field site.

One of the primary objects of the present invention is to provide a combination cutting and crimping tool for use in cutting a cable and crimping a connector thereon with the same tool, and which is of relatively compact construction facilitating convenient usage at field sites.

Another object of the present invention is to provide a combination cutting and crimping tool which has relatively few parts and is relatively simple in operation so as to be readily operated by an unskilled operator.

Still another object of the present invention is to provide a combination cutting and crimping tool employing a single housing having facility for supporting and guiding both a crimping mandrel and a cutting tool cooperable with the mandrel to facilitate cutting of a cable through an impact blow to the mandrel of the same type employed in crimping with the mandrel.

The various objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a side elevational view of a combination cutting and crimping tool constructed in accordance with the present invention, portions being broken away for clarity and with the cutting tool shown preparatory to shearing a cable;

FIG. 2 is a front elevational view of the combination cutting and crimping tool of FIG. 1;

FIG. 3 is a perspective view of the cutting tool removed from the housing of FIG. 1;

FIG. 4 is a fragmentary sectional view taken substantially along the line 4—4 of FIG. 1 looking in the direction of the arrows; and FIG. 5 is a fragmentary side elevational view showing the tool of FIG. 1 in a crimping mode of operation.

Referring now to the drawing, and particularly to FIG. 1, a combination cutting and crimping tool arrangement constructed in accordance with the present invention is indicated generally at 10. The combination cutting and crimping tool arrangement 10, which may hereinafter be termed the cutting and crimping tool, includes a housing 12 having a base portion 14 and an integral upstanding head portion 16. The housing 12 is preferably made of a suitable metallic material and may be machined, cast or forged to provide the desired shape and strength characteristics.

The base portion 14 of the housing has a flat lower surface 18 facilitating placement of the tool on a bench support surface or directly on the ground as during on-site field usage. As best seen in FIG. 1, the housing 12 has a generally C-shaped configuration so as to define a transverse recess 20 formed intermediate the housing base and head portions. The recess 20 terminates at its lower end in anvil means in the form of a generally V-shaped anvil 24 having inclined support surfaces 24a and 24b. The base portion 14 of the housing is relieved or recessed at 26a and 26b on opposite sides of the anvil 24 so that the anvil support surfaces 24a, b are raised relative to the recess surfaces 26a, b to engage the peripheral surface of a cable, such as indicated at 28, placed within the anvil 24 preparatory to cutting the cable and subsequent crimping of a tubular connector onto the end of the cable, as will be described more fully hereinbelow. The anvil 24 and its support surfaces 24a, b may be formed integral with the base portion 14 as in a casting or forging, and preferably have the upper support surfaces 24a, b machined to provide square shearing edges as indicated at 30a and 30b in FIG. 4.

The housing 12 supports a mandrel 32 for vertical axial sliding movement in a suitable vertical guide bore 34 formed in the head portion 16. The mandrel 32 is made of a suitable metallic material and is preferably cylindrical although other transverse configurations such as square or rectangular shapes may be selected. The mandrel 32 has an upper outer end surface 32a which extends above the head portion 16 of the housing and is adapted to be impacted by a hammer or other suitable instrument whereby to impart a downward axial impact force to the mandrel. The lower end 32b of the mandrel 32 is frustoconical and has a pair of cross slots 36a and 36b formed in a lower end surface 32c. The cross slots 36a and 36b are equal in size and intersect each other at 90° angles to define square corner edges at the intersections of the slots with the end surface 32c for use in the crimping mode of operation as will become more apparent hereinbelow.

To facilitate lifting of the mandrel 32 relative to the housing 12, a finger lift shaft or rod 38 is secured to the mandrel in normal relation thereto and extends through a vertical slot 40 formed in the housing 12 so as to intersect the bore 34 and the recess area 20. A coil tension spring 42 has an upper end 42a connected to the lift shaft 38 and has a lower end 42b received within a suitable vertical opening 44 in the lower base portion 14 of housing 12 where it is connected to a retaining boss 46 formed on the housing, as best seen in FIG. 1. The spring 42 is selected so as to bias the mandrel toward its downward position within the bore 34, as shown in FIG. 2, but allows upward lifting of the mandrel by grasping the lift shaft 38 which extends sufficiently outwardly from housing 12 for this purpose. Preferably, a thumb hold projection 48 is formed on the housing 12 to overlie the lift shaft 38 and facilitate placement of the operator's thumb thereagainst when lifting the mandrel 32 through the lift pin.

A second slot 50 is formed in the housing 12 so as to extend transversely through the housing base portion 14 and bisect the support surfaces 24a and 24b of the anvil 24 whereby to establish the previously described shearing edges 30a and 30b. The slot 50 intersects the longitudinal axis of bore 34 and the vertical slot 40, and is adapted to receive a cutting tool, indicated generally at 54, in cooperating relation with the housing 12 in a position wherein an upper edge of the cutting tool underlies the axis of mandrel 32.

The tool 54 includes an elongate generally rectangular body 56 having an end portion 56a adapted to be received within the slot 50. The tool body 56 has a handle end portion 56b facilitating manual insertion and positioning of the tool within the slot 50. A cutting edge 58 is formed on the lower edge of the tool end portion 56a so as to overlie the vertex of the V-shaped anvil surfaces 24a, b when the tool end 56a is inserted into slot 50. Stop projections 60a and 60b are formed on the tool body 56 at opposite ends of the cutting edge 58, as best seen in FIG. 3, and extend downwardly beyond the cutting edge so as to engage a planar surface 62 on the housing base 14 defining the bottom edge of slot 50 to prevent damage to the cutting edge during a cable shearing or cutting mode of operation. It will be appreciated that one or more upstanding stop projections may be formed on the housing surface 62 for engagement with the tool body 56 during impacting thereof to prevent damage to the cutting edge, in which case the projections 60a and 60b on the tool may be eliminated.

The operation of the combination cutting and crimping tool 10, as considered in the process of cutting a cable to form a clean flat end surface thereon and thereafter crimping a tubular connector body onto the end of the cable, is as follows. The mandrel 32 is raised by lifting the lift rod 38 and a length of cable, such as 28, is inserted within the anvil 24 in supported relation on the support surfaces 24a, b. The tool end 56a is then inserted into the slot 50 with the cutting edge 58 engaging the cable, as seen in FIG. 4, and the mandrel is released to allow engagement of the lower end surface 32c with the upper edge of the cutting tool. The upper end surface 32a of the mandrel is then hit with sufficient impact force to shear the cable and form a clean square end thereon. The stop projections 60a, b on the lower edge of the cutting tool engage the edge surface 62 of slot 50 to prevent the cutting edge from contacting the housing after the cutting tool has completely severed the cable.

After cutting or shearing the cable 28, a tubular body or sleeve portion of a connector or other tubular member, such as indicated at 64 in FIG. 5, may be placed coaxially on one of the freshly cut ends of the cable and the coaxial cable and associated connector body on the crimping anvil 24. The mandrel 32 is then moved manually downwardly to effect engagement with the tubular body 64 whereafter the mandrel is impacted against the connector sleeve body 64 to effect crimping of the connector body onto the cable. Crimping is effected by the sharp edges defined at the intersections of the cross slots 36a, b with the mandrel end surface 32c, striking the tubular connector body to form dimples which are mechanically compressed tightly against the cable.

It is thus seen that a relatively simple and inexpensive portable cutting and crimping tool arrangement is provided which facilitates field site usage for cutting cables and crimping connectors and the like thereon. One application of the cutting and crimping tool 10 lies in cutting square ends on battery cables and thereafter securing crimpable battery cable terminal connectors thereon.

While a preferred embodiment of a combination cutting and crimping tool in accordance with the present invention has been illustrated and described, it will be understood to those skilled in the art that changes and modifications may be made therein without departing from the invention in its broader aspects. Various features of the invention are defined in the following claims.

What is claimed is:

1. A combination cutting and crimping tool arrangement comprising, in combination, a housing defining anvil means adapted to receive a cable thereon in supporting relation therewith, said housing further defining a mandrel guide bore having an axis intersecting said anvil means, a mandrel supported within said guide bore and longitudinally movable therein, said mandrel having crimping means thereon for cooperation with said anvil means to crimp a connector body onto the portion of said cable supported on said anvil means when said mandrel is impacted to effect engagement of said crimping means with said connector body, said housing having a slot formed therein intersecting said anvil means and lying in a plane coplanar with the axis of said mandrel, and a cutting tool adapted to be inserted within said slot so as to overlie said anvil means and underlie said mandrel, said cutting tool having a cutting edge thereon adapted to cut a cable supported on said anvil means when an axial force is imparted to said mandrel in a direction to impart an impact force to said cutting edge sufficient to shear the cable.

2. A cutting and crimping tool as defined in claim 1 including spring means operatively associated with said housing and said mandrel for biasing said mandrel toward said anvil means.

3. A cutting and crimping tool as defined in claim 1 wherein said cutting tool has a generally rectangular cross sectional configuration, said cutting edge being formed along one lateral edge of said cutting tool and adapted for cooperation with said anvil means when inserted within said slot to facilitate cutting of a cable disposed in supporting relation on said anvil means.

4. A cutting and crimping tool as defined in claim 3 including at least one stop projection formed on said cutting tool for engagement with said housing after cutting a cable so as to prevent engagement of said cutting edge with said housing during said cutting.

5. A cutting and crimping tool as defined in claim 4 wherein said cutting tool has one of said stop projections formed thereon at each end of said cutting edge.

6. A cutting and crimping tool as defined in claim 1 wherein said slot lies in a plane intersecting said anvil means in a direction normal to the axis of a cable disposed in supporting relation on said anvil means.

7. A cutting and crimping tool as defined in claim 1 wherein said cutting tool has a handle portion facilitating manual positioning of said cutting tool within said slot.

8. A cutting and crimping tool as defined in claim 1 wherein said anvil means is defined by a substantially V-shaped anvil having inclined upwardly facing cable support surfaces, said slot intersecting said V-shaped anvil so as to bisect said support surfaces along a plane transverse to the axis of a cable when supported on said support surfaces.

9. A cutting and crimping tool as defined in claim 3 wherein said cutting tool and anvil means define mutually cooperable stop means adapted to prevent engagement of said cutting edge with said anvil means during shearing of a cable.

10. A combination cutting and crimping tool arrangement comprising, in combination, a housing having a base portion and an upstanding head portion, said base portion defining a crimping anvil adapted to receive a cable thereon in supporting relation, said housing defining a vertically disposed guide bore in said head portion, a mandrel supported within said guide bore and longitudinally movable therein, said mandrel having an end portion exposed for impacting by an external force and having a crimping surface for cooperation with said anvil to facilitate crimping of a connector body onto the portion of said cable supported on said anvil, said housing defining a slot formed in said base portion generally transverse to and lying in a plane containing the axis of said guide bore, and a generally flat elongate cutting tool adapted to be inserted within said slot so as to overlie said anvil and underlie said mandrel, said cutting tool having a cutting edge adapted to cut a cable supported on said anvil when an axial force is imparted to said tool from said mandrel of sufficient magnitude to shear the cable.

* * * * *

UNITED STATES PATENT AND TRADEMARK OFFICE
CERTIFICATE OF CORRECTION

PATENT NO. : 4,117,711
DATED : October 3, 1978
INVENTOR(S) : Wayne R. Medcraft

It is certified that error appears in the above-identified patent and that said Letters Patent are hereby corrected as shown below:

Under References Cited, Patent Number "3,342,076" should be --3,342,056--.

Signed and Sealed this

Twenty-eighth Day of August 1979

[SEAL]

Attest:

LUTRELLE F. PARKER

Attesting Officer     Acting Commissioner of Patents and Trademarks